United States Patent
Genduso et al.

(10) Patent No.: US 6,378,052 B1
(45) Date of Patent: Apr. 23, 2002

(54) DATA PROCESSING SYSTEM AND METHOD FOR EFFICIENTLY SERVICING PENDING REQUESTS TO ACCESS A STORAGE SYSTEM

(75) Inventors: Thomas B. Genduso, Apex; Donald Ingerman, Raleigh, both of NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/371,976

(22) Filed: Aug. 11, 1999

(51) Int. Cl.[7] ............................................. G06F 13/00
(52) U.S. Cl. ...................... 711/158; 711/112; 711/151; 709/102; 709/103; 710/6; 710/39; 710/54
(58) Field of Search .................. 711/112, 111, 167, 711/158, 151; 709/103, 102; 710/39, 6, 54

(56) References Cited

U.S. PATENT DOCUMENTS

| | | | |
|---|---|---|---|
| 5,787,482 A | * | 7/1998 | Chen et al. .................. 711/158 |
| 6,023,720 A | * | 2/2000 | Aref et al. ................... 709/103 |
| 6,078,998 A | * | 6/2000 | Kamel et al. ............... 711/151 |

\* cited by examiner

*Primary Examiner*—Do Hyun Yoo
*Assistant Examiner*—Jasmine Song
(74) *Attorney, Agent, or Firm*—Andrew J. Dillon

(57) ABSTRACT

A method and system in data processing system are disclosed for efficiently servicing requests to access a disk. Each of the requests are associated with a location on the disk. The requests include real-time requests and non-real time requests. A most urgent one of the requests is determined. The most urgent one of the requests is associated with a first deadline and a first location on the disk. A second most urgent one of the requests is also determined. The second most urgent one of the requests is associated with a second deadline and a second location on the disk. The first deadline is earlier in time than the second deadline. A service time is determined. The service time is earlier in time than the first deadline. The service time is determined so that sufficient time will exist to service the most urgent one of the requests before the first deadline and service the second most urgent one of the requests before the second deadline. A closest request is determined by determining whether the first location or the second location is closest to a current location of a disk arm. The closest request is either the most urgent one of the requests or the second most urgent one of the requests. In response to a current time reaching the service time, the closest request is serviced such that the most urgent one of the requests is serviced before the first deadline and the second most urgent one of the requests is serviced before the second deadline.

16 Claims, 6 Drawing Sheets

DATA PROCESSING SYSTEM AND METHOD FOR EFFICIENTLY SERVICING PENDING REQUESTS TO ACCESS A STORAGE SYSTEM

CROSS-REFERENCE TO RELATED APPLICATIONS

The present invention is related to the subject matter of co-pending patent application Ser. No. 09/148,181 entitled METHOD AND SYSTEM FOR THE DYNAMIC SCHEDULING OF REQUESTS TO ACCESS A STORAGE SYSTEM and assigned to the assignee herein filed on Sep. 3, 1998 and incorporated herein by reference.

BACKGROUND OF THE INVENTION

1. Technical Field

The present invention relates to data processing systems, and in particular to a data processing system and method for efficiently servicing a plurality of disk requests, some of which have an associated deadline or specific time by which they must be serviced. Still more particularly, the present invention relates to a data processing system and method for scheduling a plurality of pending disk requests so that sufficient time exists to service both a most urgent disk request as well as a second most urgent disk request before the expiration of the requests' deadlines.

2. Description of the Related Art

Devices in a data processing system, such as disk drive adapters, are usually connected via a bus to transmit data from one device to and from other system resources, such as the central processor and memory. Each of these devices has data that it normally transfers. For example, one device may normally transfer real-time data such as is necessary to display a multimedia presentation. A second device may normally transfer non-real-time data, such as a file transfer. A third device may transfer both real-time and non-realtime data. The data transferred by these devices may be stored in a disk drive.

Real-time data is data that has an associated deadline. The deadline defines the time by which the real-time data must be transferred. Failure to transfer real-time data prior to the associated deadline will result in lost data. Non-real-time data has no associated deadline.

A computer system needs to support the transfer of both real-time and non-real-time data simultaneously. Often, however, when both real-time and non-real-time data are supported simultaneously, real-time data is not transferred in a timely manner without adversely affecting non-real-time data transfer. Since many of the data transfers come from disks, effective, efficient disk scheduling is important to provide timely delivery of data.

Modern disk storage systems use scheduling algorithms to order requests to minimize the amount of seeking, i.e. physical arm movement, a disk must do in order to locate the requested data. One such algorithm is called the elevator or SCAN algorithm. Each data request has an associated track on the physical disk on which the requested data is stored. This algorithm orders requests according to the track location on the disk where the data is stored. The disk first services the request for data stored on the outermost track, and then proceeds to service requests for data stored on tracks that are ordered toward the innermost track. Therefore, the disk is initially traversed from outermost to innermost track. When the innermost track that contains requested data is reached, the direction is reversed so that the disk is traversed from innermost track to outermost track, like an elevator stopping at selected floors. A variant of SCAN is called CSCAN. In CSCAN, instead of reversing direction when the innermost track is reached, the arm will travel back to the outermost track and seek inward again.

When urgent requests are pending, known systems service pending requests in an order consistent with their location on the disk and the SCAN or CSCAN algorithm until the deadline of the most urgent request occurs. When the deadline is reached, the most urgent request is then serviced. A problem often arises, however, because the deadline for the second most urgent request may pass before the disk arm is able to move to the second most urgent request.

Therefore a need exists for efficiently servicing a plurality of pending requests to access a disk so that sufficient time exists to service both a most urgent request as well as a second most urgent disk request before the expiration of the requests' deadlines.

SUMMARY OF THE INVENTION

A method and system in data processing system are disclosed for efficiently servicing requests to access a disk. Each of the requests are associated with a location on the disk. The requests include real-time requests and non-real time requests. A most urgent one of the requests is determined. The most urgent one of the requests is associated with a first deadline and a first location on the disk. A second most urgent one of the requests is also determined. The second most urgent one of the requests is associated with a second deadline and a second location on the disk. The first deadline is earlier in time than the second deadline. A service time is determined. The service time is earlier in time than the first deadline. The service time is determined so that sufficient time will exist to service the most urgent one of the requests before the first deadline and service the second most urgent one of the requests before the second deadline. A closest request is determined by determining whether the first location or the second location is closest to a current location of a disk arm. The closest request is either the most urgent one of the requests or the second most urgent one of the requests. In response to a current time reaching the service time, the closest request is serviced such that the most urgent one of the requests is serviced before the first deadline and the second most urgent one of the requests is serviced before the second deadline.

The above as well as additional objectives, features, and advantages of the preferred embodiment will become apparent in the following detailed written description.

DESCRIPTION OF THE DRAWINGS

The novel features are set forth in the appended claims. The present invention itself, however, as well as a preferred mode of use, further objectives and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
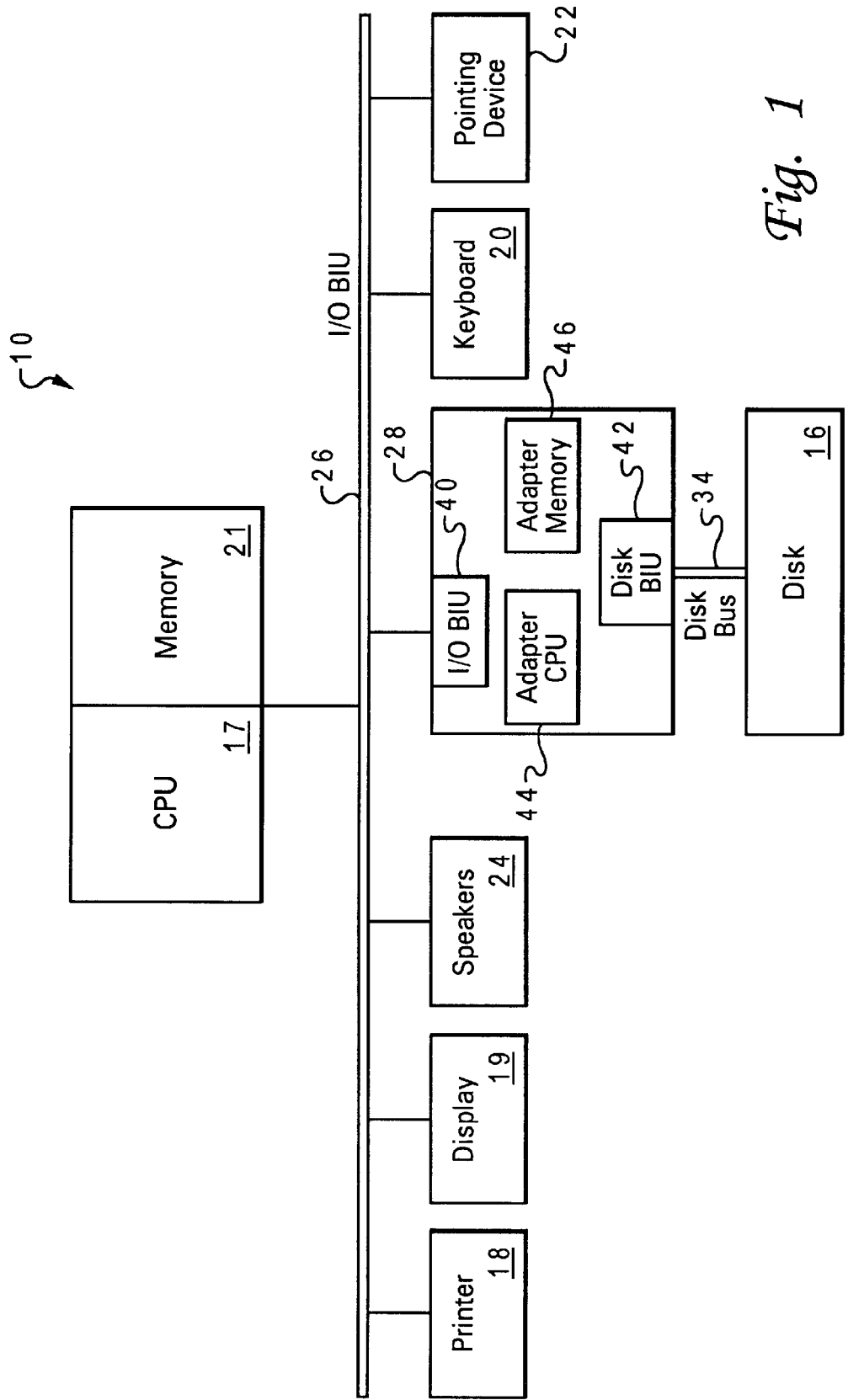
FIG. 1 depicts a high level block diagram of a data processing system which may be utilized to implement the method and system of the present invention.

A preferred embodiment of the present invention and its advantages are better understood by referring to FIGS. 1–6 of the drawings, like numerals being used for like and corresponding parts of the accompanying drawings.

The present invention is a data processing system and method for efficiently servicing a plurality of pending requests to access a disk so that sufficient time exists to service both a most urgent request as well as a second most urgent disk request before the expiration of the requests' deadlines. The most urgent disk request is associated with a first deadline and a first location on the disk. The second most urgent disk request is associated with a second deadline and a second location on the disk. The first deadline is earlier in time than the second deadline. A service time is determined. The service time is earlier in time than the first deadline, and is determined so that sufficient time will exist to service both the most urgent and second most urgent disk requests before their deadlines.

A current disk arm location is determined. A determination is made regarding whether the most urgent disk request or the second most urgent disk request is closest to the current disk arm location. This determination is made by comparing the current disk arm location to the first and second locations. When the current time reaches the service time, the closest of the most urgent or second most urgent request is serviced. Then, the other request is serviced. In this manner, both the most urgent and second most urgent requests are both serviced prior to their associated deadlines.

A move time is determined. The move time is the time it will take for the disk arm to move from the most urgent request location to the second most urgent request location.

When the second most urgent request is located between the current location of the disk arm and the location of the most urgent disk request, the service time is calculated by subtracting the move time from the first deadline, which is associated with the most urgent request. Before the current time reaches the service time, each pending request is serviced in a sequential order from the current location of the disk arm as it moves toward the second most urgent request. When the current time reaches the service time, the second most urgent request is serviced. After the second most urgent request is serviced, if the current time has not yet reached the most urgent request deadline, the pending requests are serviced from the second most urgent request disk location in a sequential order as the disk arm moves toward the most urgent request. Once the current time reaches the most urgent request deadline, the most urgent request is serviced.

The pending requests are stored as a linked list as described below. When a request is serviced, it is removed from the list. The remaining pending requests are then re-prioritized.

When the second most urgent request is not located between the current location of the disk arm and the location of the most urgent disk request, the service time is calculated by subtracting the move time from the second deadline, which is associated with the second most urgent request. Before the current time reaches the service time, each pending request is serviced in a sequential order from the current location of the disk arm as it moves toward the most urgent request. When the current time reaches the service time, the most urgent request is serviced. After the most urgent request is serviced, it is removed from the linked list. The remaining requests are re-prioritized so that the second most urgent request now becomes the most urgent request.

The following are two examples of this process. In these examples the passage of time is measured in an arbitrary time unit. Passage of time is measured by a clock of increasing time units.

(1) Second most urgent request is located on a disk track which is between the current location of the disk arm and the track on the disk where the most urgent request resides. In this example, the second most urgent request will be serviced before the most urgent request. Effectively, the second most urgent request will be serviced early in order to allow sufficient time for the disk arm to travel to the most urgent request before the most urgent request's deadline is reached. Assume the current time is at a clock setting of t=1000 time units, with the disk arm located at disk track location 500. The most urgent request must be serviced by its deadline of clock setting t=2000 time units. The most urgent request is located on the disk at track 600. The second most urgent request must be serviced by its deadline of clock setting t=3000 time units. The second most urgent request is located on the disk at track location 550. The calculations are made, and the determination is made that the time necessary to go from servicing the second most urgent request, at track 550, then moving the arm and servicing the most urgent request at disk track 600 is 500 time units. This time is referred to as the move time. From this, the determination is made that in order to service the most urgent request on time, it will be necessary to service the second most urgent request no later than t=2000−500, or at clock setting of 1500 time units. This clock setting is referred to as the reach time, or the clock setting at which the second most urgent request is serviced such that there still will be sufficient time for the most urgent request to be reached and serviced before its deadline has expired. Therefore, in the this example, the pending requests, both real-time and non-real-time, will be serviced in a sequential order from the current disk arm location at track 500 as the arm moves toward track 550. When the current time reaches the setting of t=1500 time units, the second most urgent request will be serviced and the second most urgent request will be removed from the linked list of pending requests. Since the move time is 500 time units, the disk arm will be moved such that the next request serviced will be the most urgent request. Once the most urgent request is serviced, it will be removed from the linked list. When requests are removed from the linked list, the remaining pending requests are re-prioritized.

(2) Second most urgent request is not located between the current location of the disk arm and the location on the disk of the most urgent request: In this example, the most urgent request will be serviced before the second most urgent request. Assume the current time is at a clock setting of t=1000 time units with the disk arm located at disk track 400. The most urgent request must be serviced by its deadline of clock setting t=2000 time units. The most urgent request is located on the disk at track 600. The second most urgent request must be serviced by its deadline of clock setting t=3000 time units. The second most urgent request is located on the disk at track 1000. The calculations are made and it is determined that the move time, which is the time necessary to move the disk arm from servicing the most urgent request to servicing the second most urgent request, is 1500 time units. From this, the determination is made that in order to service the second most urgent request on time, it will be necessary to service the most urgent request no later than 3000–1500, or at a clock setting of t=1500 time units. This clock setting is referred to as the reach time, or the setting at which the most urgent request is serviced with sufficient time remaining for the second most urgent request to be reached before its deadline has expired. Therefore, the pending requests, both real-time and non-real-time, will be serviced in a sequential order from the current disk arm location at track 400 as the disk arm moves toward disk track location 600. When the current time reaches t=1500 time units, the most urgent request will be serviced and it will be removed form the linked list of the pending requests. Sufficient time remains to service the second most urgent request prior to its deadline. The pending requests will be re-prioritized with what was the second most urgent request in this example becoming the most urgent request.

Two categories of real-time requests exists: hard real-time requests and soft real-time requests. These requests, along with non-real-time requests, are stored in a scan queue and processed sequentially in accordance with a SCAN or CSCAN algorithm until either a deadline or the service time is reached as described herein.

Real-time data may be classified into two categories: "hard real-time data" and "soft real-time data". Hard real-time data is data that must be transferred within a specified period of time. Failure to transfer any portion of hard real-time data before the deadline is catastrophic because critical data will be lost. Thus, the performance objective for the transfer of hard real-time data is to have no missed deadlines, and consequently, no lost data. An example of hard real-time data is aircraft flight system data.

Soft real-time data is data that should be transferred within a specified period of time, or deadline. Failure to transfer soft real-time data before the deadline results in lost data, where loss of some data is tolerable. The performance objective for the transfer of soft real-time data is to have a low percentage of missed deadlines, and consequently, a low percentage of lost data. An example of soft real-time data is packetized voice data.

All hard real-time requests are processed, even if they are past their associated deadlines. Soft real-time requests past their associated deadlines are discarded.

FIG. 1 depicts a pictorial representation of a data processing system 10 which may be utilized to implement the method and system of the present invention. Data processing system 10 includes a disk 16 and a printer/output device 18. One or more disks may be utilized to store the various data objects or files which may be periodically accessed, processed, and presented within data processing system 10 in accordance with the method and system of the present invention.

Data processing system 10 may be implemented utilizing any suitably configured personal computer, mini computer, or mainframe computer. Data processing system includes a CPU 17, memory 21, a computer display 19, keyboard 20, input pointing device 22, and speakers 24. Those skilled in the art will appreciate that input pointing device 22 may be implemented utilizing a pointing stick, a mouse, a track ball, or a pen.

The processes described herein are supported by mechanisms within a disk adapter 28. Disk adapter 28 is coupled to CPU 17 by means of an I/O bus 26. In current systems, this bus is typically a PCI bus. Adapter 28 includes an I/O bus interface unit (BIU) 40. The I/O BIU 40 manages the protocol necessary for data and control information to be transmitted across I/O bus 26 between adapter 28 and CPU 17 and memory 21 to which adapter 28 is attached. In a similar fashion, disk adapter 28 attaches to disk 16 by means of a disk bus 34. In current systems bus 34 is typically a SCSI bus. Similarly, adapter 28 includes a disk BIU 42. Disk BIU 42 manages the protocol necessary for data and control information to be transmitted across disk bus 34 between adapter 28 and disk 16. Within adapter 28 there is a processing unit 44. Processing unit 44 can be implemented as a state machine or as a programmable microprocessor. Processing unit 44 is capable of executing the algorithms specified herein, as well as accessing the data stored in adapter memory 46.

Within adapter 28 is adapter memory 46. Adapter memory 46 can be implemented using Random Access Memory (RAM). Adapter processor 44 is capable of addressing locations within RAM 46, and can read and write data to adapter memory 46. Data and control information to or from the CPU 17 can be stored in adapter memory 46. Also contained within adapter memory 46 are a number of software data structures which are described below.

When adapter 28 is initially powered on, adapter 28 will perform a number of specific operations which include establishing a buffer pool space in adapter memory 46, establishing the scan queue data structure within adapter memory 46, and determining the geometry of the attached disk 16.

While data processing system 10 is in operation, adapter 28 will collect information that can be used in an effort to control the performance of adapter 28. This information is collected and stored in adapter memory 46. The information includes the number of times a hard real-time deadline was missed, the number of times soft real-time data were discarded due to a missed deadline, and the number of requests that have been serviced.

When adapter 28 is in operation, the information collected will be periodically checked by CPU 17. Depending on the values collected, CPU 17 may modify the flow of data through adapter 28.

Adapter memory 46 represents a collection of addressable storage locations within adapter 28. Adapter memory 46 is separate from and independent of memory 21.

A number of logical data structures are contained within memory 46 of adapter 28:

(1) A scan queue 50: A specialized version of a doubly linked list data structure, for the purpose of ordering the outstanding requests to the disk. Scan queue 50 includes a plurality of scan elements 52.

(2) A buffer pool: A pool of storage locations where the I/O control blocks received from CPU 17 are stored.

(3) A set of four buffers:

(A) Most urgent hard real-time request buffer 54: This buffer includes two fields. The first field 56 includes the time, also called a deadline, by which the most urgent hard real-time request must be serviced. The second field 58 includes a pointer to the location in scan queue 50 that contains the most urgent hard real-time request. When there are no hard real-time requests in scan queue 50, the value in field 58 is set to the NULL value.

(B) Most urgent soft real-time request buffer 60: This buffer includes two fields. The first field 62 includes the time, i.e. deadline, by which the most urgent soft real-time request must be serviced. The second field 64 includes a pointer to the location in scan queue 50 that includes the most urgent soft real-time request. In the event there are no soft real-time requests in scan queue 50, the value in field 64 is set to the NULL value.

(C) Current scan track pointer 66: The scan track pointer buffer includes two fields. The first field 68 includes a pointer to the element in scan queue 50 that is to be serviced next by disk 16. The second field 70 includes an indicator as to the direction in scan queue 50 to select the next element. This indicator can specify either ascending or descending track numbers.

(D) Status register which also includes the current time clock count 72: The status register includes three fields which are pertinent to the operation of the present invention. The first field includes a disk busy indicator. This indicator is set when the disk is busy servicing a request and no further requests can be dispatched to it. This indicator is reset when the disk can receive another request. The second field contains the scan queue empty indicator. This indicator is set when there are one or more elements in the scan queue. It is reset when there are no elements in the scan queue. The third field 72 includes the current clock value. This is an encoding of the current time. The encoding is consistent with the time encoding included within the requests.

Scan queue 50 is a doubly linked list. The request which is to be serviced next by disk 16 is selected by traversing scan queue 50. Also, when either the most urgent hard real-time request or the most urgent soft real-time request must be immediately serviced, the current pointer can be directly updated and the scan can effectively continue without the need for reordering scan queue 50.

Figure 2:
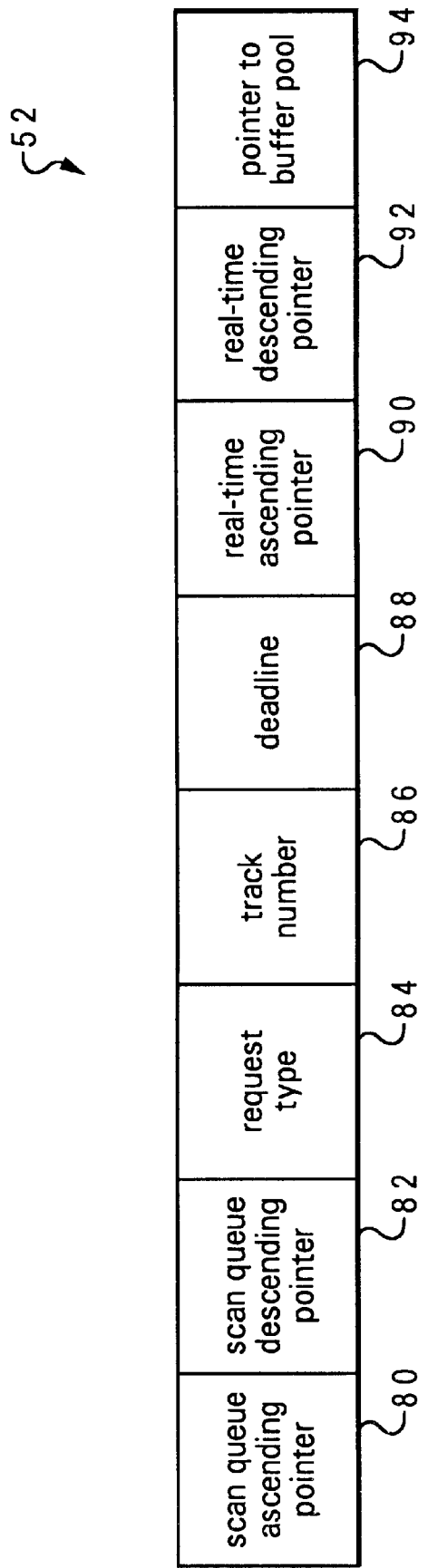
FIG. 2 illustrates a pictorial representation of scan queue elements and the associated fields included within each element in accordance with the method and system of the present invention.

Scan queue elements 52 have the structure as depicted in FIG. 2. In a manner consistent with the concept of a doubly linked list, the scan queue ascending pointer 80 points to the element of scan queue 50 which would have the next higher track number. Similarly, the scan queue descending pointer 82 points to the element of scan queue 50 which would have the next lower track number. When the value in scan queue ascending pointer 80 is set to NULL, this indicates that this element is the last element in scan queue 50, i.e. the element with the highest track number. Similarly, when the value in scan queue descending pointer 82 is set to NULL, this indicates that this element is the first element in scan queue 50, i.e. the element with the lowest track number. When scan queue ascending pointer 80 and scan queue descending pointer 82 of a element are both NULL, the element is the only element in scan queue 50.

The request type 84 indicates the type of service request. The request types are hard real-time, soft real-time, and non-real-time.

The track number 86 includes the track number on disk 16 that contains the requested data. The track number is used to determine where in scan queue 50 the request is to be placed.

The deadline 88 is used to indicate when the element in scan queue 50 must be serviced. The deadline only has relevance if the request is real-time.

The real-time ascending pointer 90 and the real-time descending pointer 92 are used to effectively "chain together" the real-time requests. Just as scan queue 50 is a doubly linked list which indicates the order by which requests are to be serviced by disk 16, real-time ascending pointer 90 and real-time descending pointer 92 are used to order the real-time requests within scan queue 50 by their urgency. For hard real-time elements in scan queue 50, their ascending real-time pointer 90 points to the next less urgent hard real-time request in scan queue 50. Descending real-time pointer 92 points to the next most urgent hard real-time request in scan queue 50.

Similarly, for soft real-time elements, ascending real-time pointer 90 points to the next less urgent soft real-time request in scan queue 50 and descending real-time pointer 92 points to the next most urgent soft real-time request in scan queue 50. In both cases, for the most urgent real-time requests in scan queue 50, setting ascending pointer 90 of a hard real-time element to NULL indicates that this element is the least urgent hard real-time request currently in scan queue 50. Similarly, setting descending pointer 92 of a hard real-time element is set to NULL indicates that this element is currently the most urgent hard real-time element currently in scan queue 50. This principle is the same for the soft real-time requests currently in scan queue 50. For non-real-time requests, real-time ascending 90 and descending 92 pointers are set to NULL.

The pointer to buffer pool 94 points to the location in the buffer pool where host computer I/O command block data is placed.

The manner by which requests are placed into scan queue 50 is now described. When an application program running on CPU 17 and accessing memory 21 wishes to access disk 16, whether to write data to or read data from disk 16, the application will construct an I/O command request block. The I/O command request block will include specifications for the following data which are significant to the operation of the present invention: type of request, deadline, and logical block address. The deadline is an encoding of the time by which the request must be serviced. The logical block address is translated by adapter 28 to indicate the disk track number which is used by the present invention.

The I/O command request block will be placed into adapter memory 46 where it will be processed. From the information included within the request block, one or more scan queue elements will be constructed. The I/O command request block data will be stored in the adapter buffer pool. The location in the buffer pool where it is stored is in pointer to buffer pool 94 in the scan queue element.

The following is a simplified example of the operation of the scan queue. In this example, the scan queue includes ten logical memory locations for storing scan queue elements. The disk has 1000 tracks. Currently, there are eight outstanding disk requests. Of these requests, three are hard real-time requests and three are soft real-time requests. The hard real-time requests are for tracks 345, 346, and 700. Track 345 is the most urgent. Track 700 is the least urgent. The soft real-time requests are for tracks 100, 101, and 102.

Figure 3:
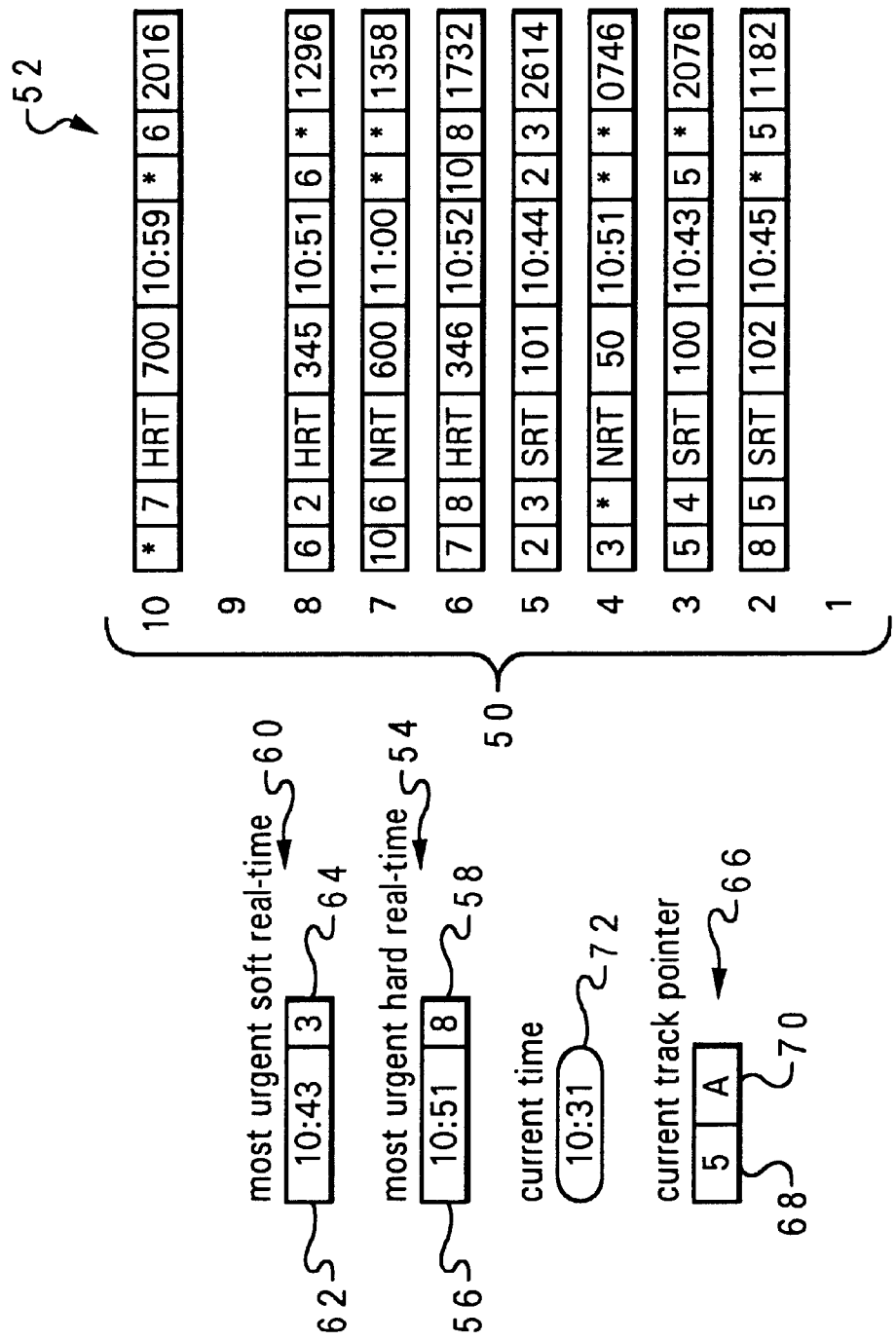
FIG. 3 depicts a plurality of scan queue elements stored within a scan queue, a most urgent soft real-time buffer, a most urgent hard real-time buffer, a current time clock, and a current track scan pointer in accordance with the method and system of the present invention.

FIG. 3 depicts a scan queue having scan queue elements, a most urgent soft real-time buffer, a most urgent hard real-time buffer, a current time clock, and current track scan pointer in accordance with the method and system of the present invention. The current time is 10:31. The most urgent hard real-time request must be serviced at or before 10:51. The most urgent soft real-time request must be serviced at or before 10:43. The current scan track pointer is pointing to the logical memory location 5. The current track pointer indicated that the scan is to be in the ascending direction.

Assuming no further requests are received and that the next request can be serviced before any deadlines are reached, the following occurs. The current track pointer points to the element stored at location 5. This is the request for track 101. When the disk is ready, this request is removed from the scan queue and sent to the disk. The scan queue element is removed using the standard methodology for removing an element from a doubly linked list.

Figure 4:
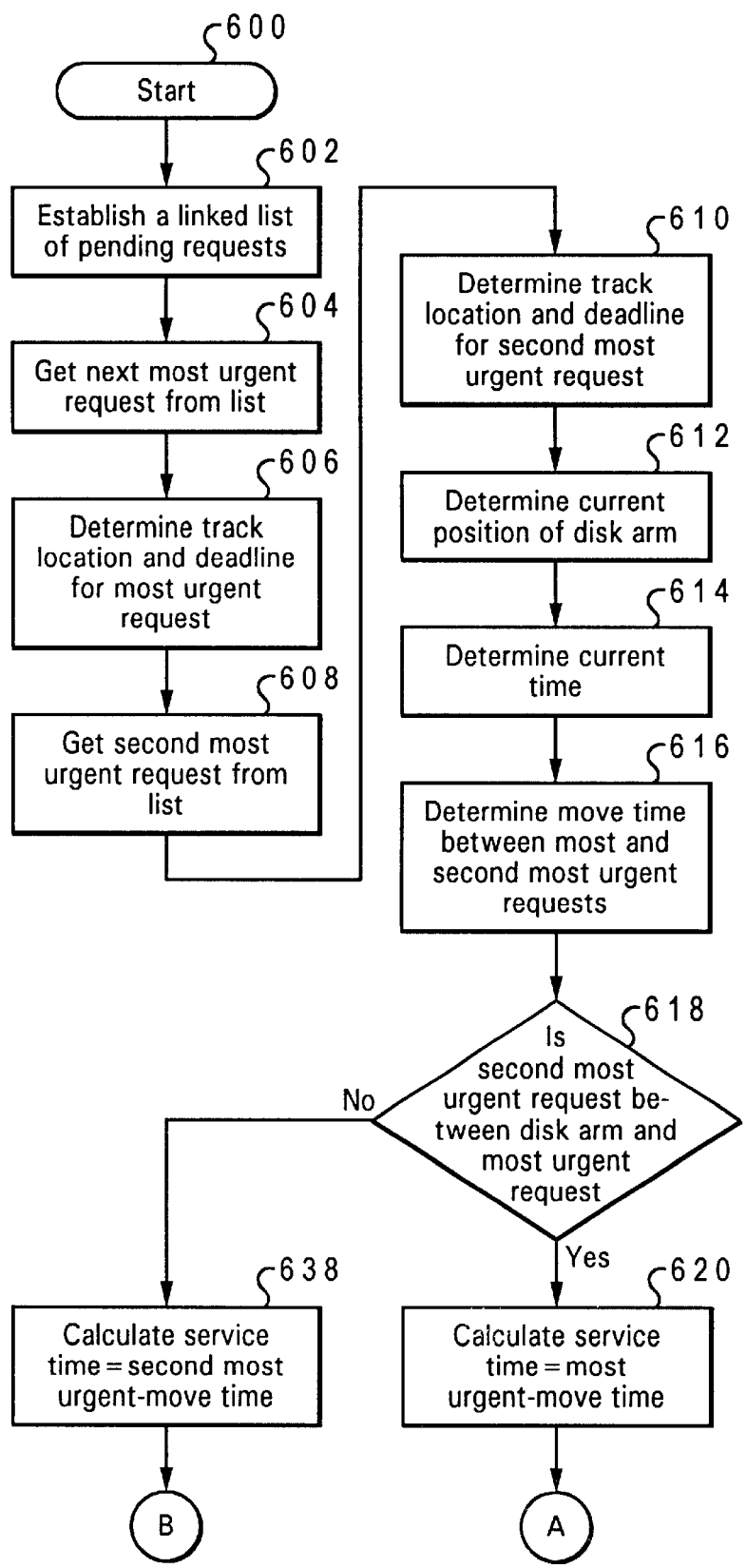
FIGS. 4–6 together illustrate a high level flow chart which depicts servicing a plurality of pending requests to access a disk such that each request is serviced before its associated deadline in accordance with the method and system of the present invention.
Figure 5:
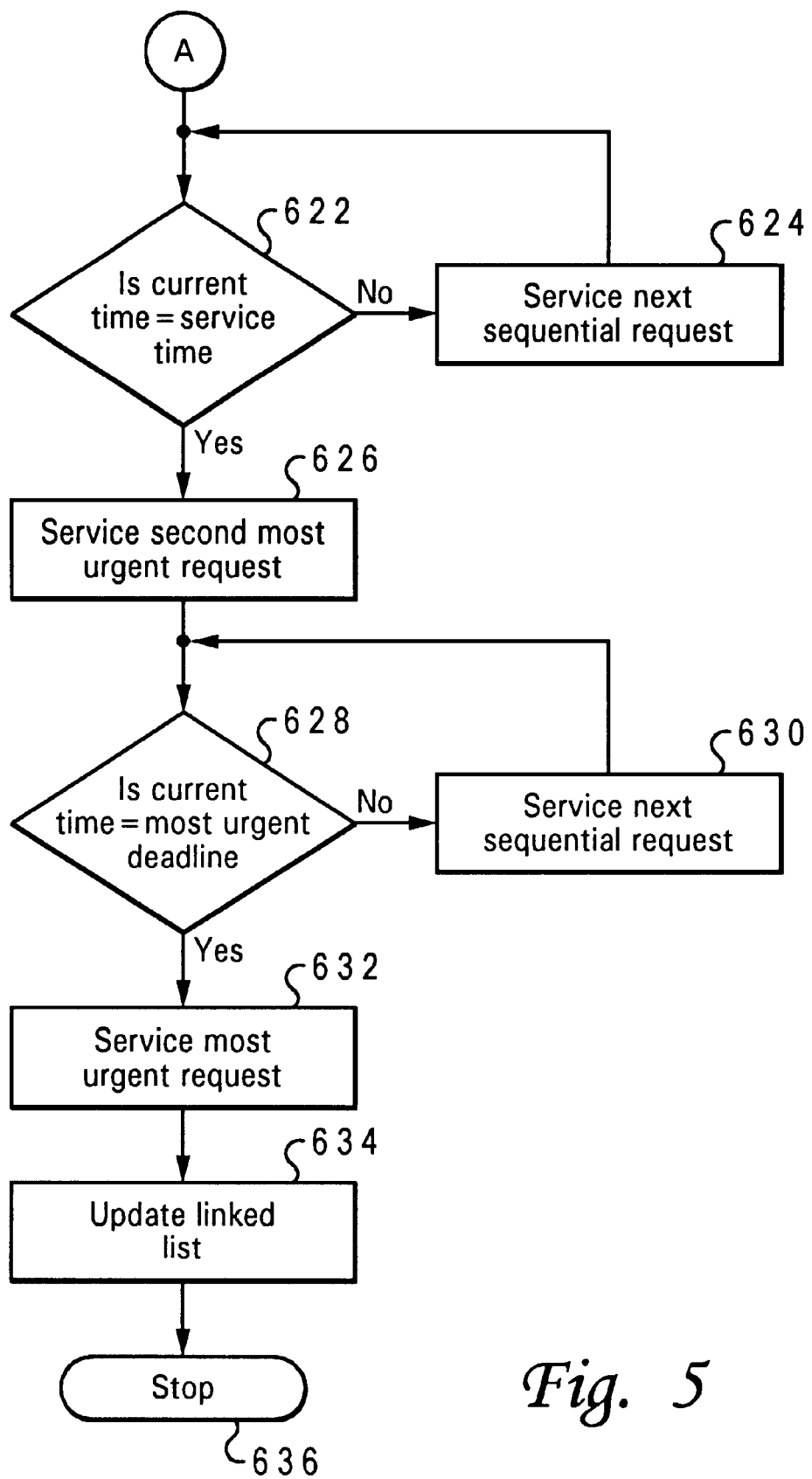
Figure 6:
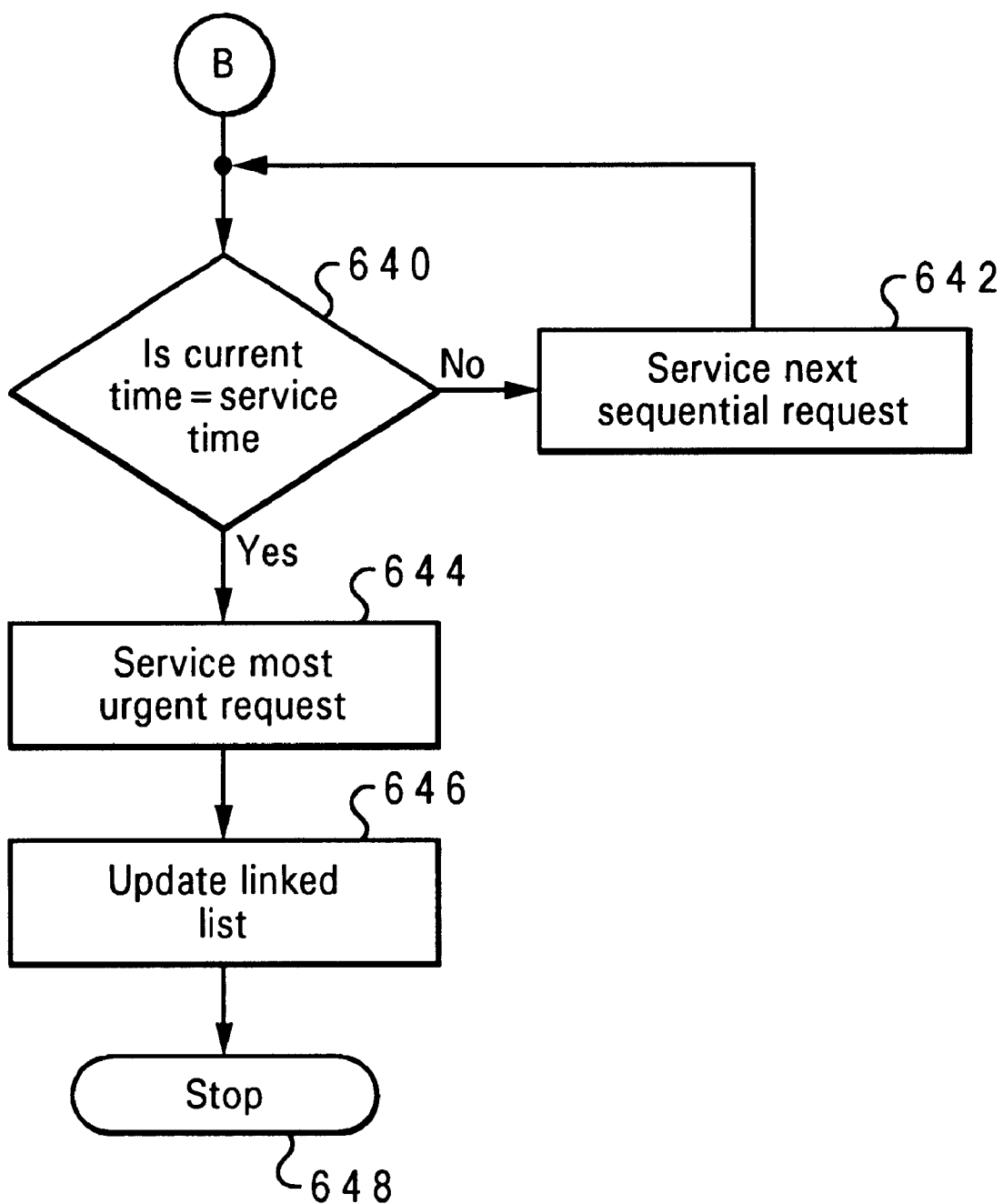

FIGS. 4–6 together illustrate a high level flow chart which depicts servicing a plurality of pending requests to access a disk such that each request is serviced before its associated deadline in accordance with the method and system of the present invention. The process starts as depicted at block 600 and thereafter passes to block 602 which illustrates establishing a linked list of pending disk requests. Next, block 604 depicts getting the most urgent request from the list. The process then passes to block 606 which illustrates determining the track location and deadline associated with this request.

Block 608, then, depicts getting the second most urgent request from the list. Next, block 610 illustrates determining the track location and deadline associated with this request. The process then passes to block 612 which depicts determining a current position of the disk arm. Thereafter, block 614 illustrates determining a current time. Block 616, then, depicts determining a move time between the most urgent request and the second most urgent request. The move time is the time it will take for the disk arm to move from the disk location of the most urgent request to the disk location of the second most urgent request.

The process then passes to block 618 which illustrates a determination of whether or not the second most urgent request is physically located between the current location of the disk arm and the physical location of the most urgent request. If a determination is made that the second most urgent request is physically located between the current location of the disk arm and the physical location of the most urgent request, the process passes to block 620 which depicts calculating a service time. The service time in this case, where the second most urgent request is located between the most urgent request and the current position of the disk arm, is equal to the deadline associated with the most urgent request minus the move time. The process then passes to 622 which illustrates a determination of whether or block not the current time has reached the service time. If a determination is made that the current time has not reached the service time, the process passes to block 624 which depicts servicing the request located next sequentially on the disk. Therefore, the disk arm will move from its current location to the pending request located closest to the current disk arm position. The process then passes back to block 622.

Referring again to block 622, if a determination is made that the current time does now equal the service time, the process passes to block 626 which illustrates servicing the second most urgent request. The process then passes to block 628 which depicts a determination of whether or not the current time has reached the deadline associated with the most urgent request. If a determination is made that current time has not reached the deadline associated with the most urgent request, the process passes to block 630 which depicts servicing the request located next sequentially on the disk. The process then passes back to block 628. Referring again to block 628, if a determination is made that the current time does now equal the deadline associated with the most urgent request, the process passes to block 632 which illustrates servicing the most urgent request. The process then passes to block 634 which depicts updating the linked list. The list is updated to remove the serviced requests and re-prioritize the remaining requests. The process then terminates as illustrated at block 636.

Referring again to block 618, if a determination is made that the second most urgent request is not physically located between the current location of the disk arm and the physical location of the most urgent request, the process passes to block 638 which depicts calculating a service time. The service time in this case, where the second most urgent request is not located between the most urgent request and the current position of the disk arm, is equal to the deadline associated with the second most urgent request minus the move time. The process then passes to block 640 which illustrates a determination of whether or not the current time has reached the service time. If a determination is made that the current time has not reached the service time, the process passes to block 642 which depicts servicing the request located next sequentially on the disk. The process then passes back to block 640.

Referring again to block 640, if a determination is made that the current time does now equal the service time, the process passes to block 644 which illustrates servicing the most urgent request. The process then passes to block 646 which depicts updating the linked list. The list is updated to remove the serviced requests and re-prioritize the remaining requests. The process then terminates as illustrated at block 648.

While a preferred embodiment has been particularly shown and described, it will be understood by those skilled in the art that various changes in form and detail may be made therein without departing from the spirit and scope of the preferred embodiment.

What is claimed is:

1. A method in a data processing system for efficiently servicing a plurality of requests to access a disk, each of said plurality of requests being associated with a location on said disk, said plurality of requests including real-time requests and non-real-time requests, said method comprising the steps of:

determining a most urgent one of said plurality of requests, said most urgent one of said plurality of requests being associated with a first deadline and a first location on said disk;

determining a second most urgent one of said plurality of requests, said second most urgent one of said plurality of requests being associated with a second deadline and a second location on said disk, wherein said first deadline is earlier in time than said second deadline;

determining whether said second location of said second most urgent one of said plurality of requests is located between a current location of a disk arm and said first location of said most urgent one of said plurality of requests; and determining a service time, said service time being earlier in time than said first deadline, said service time being determined by subtracting a move-time required to move said disk arm from said first location to said second location from said first deadline in response to a determination that said second location is located between said current location and said first location and determining said service time by subtracting said move-time from said second deadline in response to a determination that said second location is not located between said current location and said first location so that sufficient time will exist to service said most urgent one of said plurality of requests before said first deadline and service said second most urgent one of said plurality of requests before said second deadline.

2. The method according to claim 1, further comprising the steps of:

determining a closest request by determining whether said first location or said second location is closest to a current location of a disk arm, wherein said closest request is either said most urgent one of said plurality of requests or said second most urgent one of said plurality of requests; and servicing said closest request in response to a current time reaching said service time, wherein said most urgent one of said plurality of requests is serviced before said first deadline and said second most urgent one of said plurality of requests is serviced before said second deadline.

3. The method according to claim 2, further comprising the step of prior to said current time being said service time, servicing said plurality of requests in a first sequential order from said current location of said disk arm.

4. The method according to claim 1, further comprising the steps of:

servicing said second most urgent one of said plurality of requests in response to a determination that said second location is located between said current location and said first location and in response to a current time reaching said service time;

determining if said current time has reached said first deadline after said servicing said second most urgent one of said plurality of requests;

servicing said most urgent one of said plurality of requests in response to a determination that said current time has reached said first deadline; and servicing said plurality of requests in a second sequential order from said second location until said current time reaches said first deadline in response to a determination that said current time has not reached said first deadline.

5. The method according to claim 4, further comprising the steps of:

servicing said most urgent one of said plurality of requests in response to a determination that said second location is not located between said current location and said first location and in response to said current time reaching said service time; and servicing said plurality of requests in a third sequential order from said current location of said disk arm until said current time reaches said service time in response to a determination that said current time has not reached said service time.

6. The method according to claim 5, further comprising the step of servicing said plurality of requests utilizing said disk arm traveling in either an ascending or descending direction.

7. The method according to claim 6, further comprising the step of prior to determining a next of said plurality of requests in said sequential order, determining a disk arm direction.

8. The method according to claim 7, wherein said step of determining a next of said plurality of requests in said sequential order further comprises the step of determining a next of said plurality of requests in said sequential order, said next of said plurality of requests being one of said plurality of requests having an associated location on said disk physically closest to a last processed one of said plurality of requests in said determined disk arm direction.

9. A data processing system for efficiently servicing a plurality of requests to access a disk, each of said plurality of requests being associated with a location on said disk, said plurality of requests including real-time requests and non-real-time requests, comprising:

means for determining a most urgent one of said plurality of requests, said most urgent one of said plurality of requests being associated with a first deadline and a first location on said disk;

means for determining a second most urgent one of said plurality of requests, said second most urgent one of said plurality of requests being associated with a second deadline and a second location on said disk, wherein said first deadline is earlier in time than said second deadline;

means for determining whether said second location of said second most urgent one of said plurality of requests is located between a current location of a disk arm and said first location of said most urgent one of said plurality of requests; and means for determining a service time, said service time being earlier in time than said first deadline, said service time being determined by subtracting a move-time required to move said disk arm from said first location to said second location from said first deadline in response to a determination that said second location is located between said current location and said first location and determining said service time by subtracting said move-time from said second deadline in response to a determination that said second location is not located between said current location and said first location so that sufficient time will exist to service said most urgent one of said plurality of requests before said first deadline and service said second most urgent one of said plurality of requests before said second deadline.

10. The system according to claim 9, further comprising:

means for determining a closest request by determining whether said first location or said second location is closest to a current location of a disk arm, wherein said closest request is either said most urgent one of said plurality of requests or said second most urgent one of said plurality of requests; and means for servicing said closest request in response to a current time reaching said service time, wherein said most urgent one of said plurality of requests is serviced before said first deadline and said second most urgent one of said plurality of requests is serviced before said second deadline.

11. The system according to claim 10, further comprising means for prior to said current time being said service time, servicing said plurality of requests in a first sequential order from said current location of said disk arm.

12. The system according to claim 9, further comprising:

means for servicing said second most urgent one of said plurality of requests in response to a determination that said second location is located between said current location and said first location and in response to a current time reaching said service time;

means for after said servicing said second most urgent one of said plurality of requests, determining if said current time has reached said first deadline;

means for servicing said most urgent one of said plurality of requests in response to a determination that said current time has reached said first deadline; and means for servicing said plurality of requests in a second sequential order from said second location until said current time reaches said first deadline in response to a determination that said current time has not reached said first deadline.

13. The system according to claim 12, further comprising:

means for servicing said most urgent one of said plurality of requests in response to a determination that said second location is not located between said current location and said first location and in response to said current time reaching said service time; and means for servicing said plurality of requests in a third sequential order from said current location of said disk arm until said current time reaches said service time in response to a determination that said current time has not reached said service time.

14. The system according to claim 13, further comprising means for servicing said plurality of requests utilizing said disk arm traveling in either an ascending or descending direction.

15. The system according to claim 14, further comprising means for prior to determining a next of said plurality of requests in said sequential order, determining a disk arm direction.

16. The system according to claim 15, wherein said means for determining a next of said plurality of requests in said sequential order further comprises means for determining a next of said plurality of requests in said sequential order, said next of said plurality of requests being one of said plurality of requests having an associated location on said disk physically closest to a last processed one of said plurality of requests in said determined disk arm direction.

* * * * *